Oct. 19, 1971   D. G. HARTER   3,613,391
HEAD PRESSURE CONTROL SYSTEM
Filed Sept. 12, 1967   4 Sheets-Sheet 1

FIG. 1

INVENTOR
DONALD G. HARTER

BY Strauch, Nolan, Neale,
Nies & Kurz
ATTORNEYS

Oct. 19, 1971　　　D. G. HARTER　　　3,613,391
HEAD PRESSURE CONTROL SYSTEM
Filed Sept. 12, 1967　　　　　　　　　　　　4 Sheets-Sheet 2

INVENTOR
DONALD G. HARTER

BY Strauch, Nolan, Neale,
Nies & Kurz
ATTORNEYS

Oct. 19, 1971     D. G. HARTER     3,613,391

HEAD PRESSURE CONTROL SYSTEM

Filed Sept. 12, 1967     4 Sheets-Sheet 3

INVENTOR
DONALD G. HARTER

BY Strauch, Nolan, Neale,
Nies & Kurz
ATTORNEYS

Oct. 19, 1971  D. G. HARTER  3,613,391
HEAD PRESSURE CONTROL SYSTEM
Filed Sept. 12, 1967  4 Sheets-Sheet 4

FIG. 6

INVENTOR.
DONALD G. HARTER
BY
Strauch, Nolan, Neale,
Nies & Kurz
ATTORNEYS

United States Patent Office 3,613,391
Patented Oct. 19, 1971

3,613,391
HEAD PRESSURE CONTROL SYSTEM
Donald G. Harter, Scarsdale, N.Y., assignor to White Consolidated Industries, Inc., Cleveland, Ohio
Filed Sept. 12, 1967, Ser. No. 667,275
Int. Cl. F25b 39/04
U.S. Cl. 62—184                                    10 Claims

ABSTRACT OF THE DISCLOSURE

Motor speed controls including ramp and pedestal or phase type speed control circuitry and a pressure sensing transducer for altering the speed of the controlled motor as the sensed pressure changes. An arrangement for controlling the head pressure in a refrigeration type air conditioning system by varying the speed of the system's condensor fan motor which employs such a control and in which the transducer of the control senses the system pressure.

BACKGROUND, SUMMARY, AND OBJECTS OF THE INVENTION

In one aspect this invention relates to motor speed controls and, more specifically, to controls for varying the speed of an electric motor as the pressure on a specified body of fluid changes. In another aspect the present invention relates to the use of pressure responsive motor speed controls in maintaining a predetermined minimum pressure on the refrigerant in refrigeration type air conditioning systems to insure efficient operation under varying ambient conditions.

The principles of the present invention may be used to particular advantage to insure efficient operation of air conditioning systems, as just mentioned; and these principles will accordingly be developed primarily by relating them to this particular application. However, as will be readily apparent to those skilled in the arts to which this invention pertains, motor speed controls of the type mentioned above have many other applications. The development of the principles of the invention in the manner just discussed is accordingly intended to illustrate and explain but not limit the scope of the invention.

The condenser of the typical refrigeration type air conditioning system is located out-of-doors or in heat exchange relation with outdoor air and is therefore subjected to a wide variety of ambient temperatures. During wintertime or other cold weather operation, outdoor temperatures may drop sufficiently low to materially reduce the condensing temperature of the refrigerant in the condenser. This produces a corresponding reduction in head pressure on the high pressure side of the refrigeration system, resulting in a decreased pressure differential across the thermal expansion valve or other refrigerant metering device in the system. Because of the reduced pressure difference across the refrigerant metering device, less refrigerant flows from the condenser to the evaporator; and the capacity of the refrigeration system is accordingly reduced.

Furthermore, in some instances, the reduction in head pressure at low ambient temperatures may result in the evaporator coil being cooled to a temperature below freezing, allowing condensed moisture to freeze on the evaporator coil. As the layer of ice builds up on the evaporator coil, it insulates the coil from the refrigeration load and causes a further reduction in system capacity.

One way of preventing a pressure drop on the high pressure side of the refrigeration system and thereby maintaining the minimum pressure differential across the refrigerant metering device required for efficient operation is to reduce the speed of the condenser fan motor as the ambient temperature falls and thereby decrease the volume of air blown across the condenser coil. This limits the amount of heat which can be extracted from the refrigerant as it passes through the condenser, insuring that the refrigerant temperature, and therefore its pressure, do not fall below the specified minimum. With the pressure on the high side of the system at or above this minimum, the pressure difference across the refrigerant metering valve will be at or above the level necessary for efficient operation of the refrigeration system.

Systems for maintaining minimum head pressures in refrigeration systems by controlling condenser fan speed have heretofore been proposed. Exemplary of these previously known systems is that described in U.S. Patent No. 3,196,629 issued July 27, 1965, to R. E. Wood for Refrigeration Head Pressure Control Systems.

In the previously known head pressure control systems, such as that described in the patent just mentioned, the speed of the condenser fan motor is decreased as the temperature of the condensed refrigerant in the condenser decreases and increased as this temperature increases. In other words the condenser fan speed is keyed to the refrigerant temperature.

This method of regulating condenser fan speed control is relatively inaccurate since the condensing temperature may or may not be proportional to the head pressure on the refrigerant in the high pressure side of the refrigeration system depending upon the ambient conditions at the condenser and the heat load on the refrigeration system therefore in given circumstances, this type of previously known control system may not be capable of so controlling condenser fan speed as to maintain the desired minimum head pressure on the refrigerant in the high pressure side of the refrigeration system. Furthermore, this type of control is at best only capable of proportioning motor speed to refrigerant temperature over a narrow temperature range.

It is an important and primary object of the present invention to provide novel, improved refrigeration system controls which are capable of regulating system operation in such a manner as to maintain the head pressure on the refrigerant in the high pressure side of the system at or above the level necessary to insure efficient operation of the refrigeration system under ambient temperature and refrigeration load conditions including those where previously known control systems are not capable of providing satisfactory regulation.

Another important and related primary object is the provision of controls capable of accurately regulating the speed of the controlled motor under conditions which otherwise produce a wide range of head pressures.

The control systems contemplated by the present invention are like those heretofore known to the extent that they maintain minimum head pressures by decreasing condenser fan speeds as ambient temperatures at the condenser coil decrease. However, they differ markedly from those heretofore known in that the condenser fan speed is keyed directly to the head pressure on the refrigerant in the high pressure side of the system rather than to the temperature at which the refrigerant condenses as in the previously known system. As a result, the novel control systems disclosed herein are capable of accurately proportioning fan speed control to refrigerant head pressure over a relatively wide pressure range and of maintaining the desired minimum pressure on the refrigerant regardless of the ambient conditions and refrigeration load.

Another important feature of the novel fan speed control systems of the present invention is an integral timing device which overrides the speed regulating section of the control system and effects full speed operation of the condenser fan when the operation of the refrigeration system is first initiated. This is important because in certain types of systems, particularly those using capillary tubes as expansion devices, the pressure within the system decreases during the system off-cycle. When this occurs while outside air temperatures are relatively high the head pressure will rise rapidly when the compressor subsequently comes on and starts pumping refrigerant through the refrigeration system. However, in the systems heretofore known, the condenser fan motor is not started until the pressure reaches a predetermined level irrespective of the rate of pressure increase. Accordingly, under the ambient conditions just mentioned, it is possible to have a rate of pressure rise so great that excessively high pressures will be reached before the fan motor accelerates to a speed at which it will move sufficient air across the condenser coil to keep the pressure to a reasonable level. Accordingly, under such conditions, there may be tripping of high pressure safety devices or system component failure in the previously known types of systems.

In the present invention, in contrast, the condenser fan is started at the same time as the compressor and kept at full speed for 40–60 seconds before the pressure responsive part of the control takes over regulation of the fan speed. This permits the head pressure to increase to the normal operating level under high ambient temperature conditions without exceeding an acceptable rate of increase. At the same time, the time interval is sufficietly short that the effect upon the metering function of the system expansion device is negligible during low ambient temperature operation.[1]

Among the other important features of the novel controls disclosed herein are arrangements for adjusting the speeds at which the controlled motor will run for pressures of predetermined magnitude, for preventing overloading of the control system by power surges, and for suppressing radio frequency noise generated during operation of the controlled motor.

From the foregoing it will be apparent that other important but more specific objects of the present invention include the provision of novel, improved head pressure control systems in accord with the previously stated objects:

(1) In which the speed of the condenser fan of the refrigeration system is related directly to the pressure on the refrigerant in the high pressure side of the system.

(2) Which are capable of accurately relating the condenser fan motor speed to the sensed pressure over a wide range of pressures.

(3) Which provide a mode of operation on start-up of the system that is capable of preventing the refrigerant pressure from rising at an unacceptably high rate.

(4) Which are capable of accomplishing the goal specified in the preceding object without adversely affecting to a significant extent the minimum pressure maintaining function of the system.

(5) Which, in conjunction with objects (3) and (4), make provision for effecting full-speed operation of the condenser fan for a predetermined period when operation of the refrigeration system is first initiated.

(6) In which provision is made for adjusting the speeds at which the condenser motor will run for a given head pressure.

(7) In which provision is made for protection against overloading.

(8) In which provision is made for the suppression of radio frequency signals.

Another important object of the present invention resides on the provision of novel, improved pressure responsive motor speed controls of broad application having various ones of the attributes discussed above and various combinations of these attributes.

Additional important objects, further novel features, and other significant advantages of the present invention will become apparent from the appended claims and as the ensuing detailed description and discussion proceeds in conjunction with the accompanying drawing.

DETAILED DESCRIPTION AND DISCUSSION OF EXEMPLARY PREFERRED EMBODIMENTS

Figure 1:
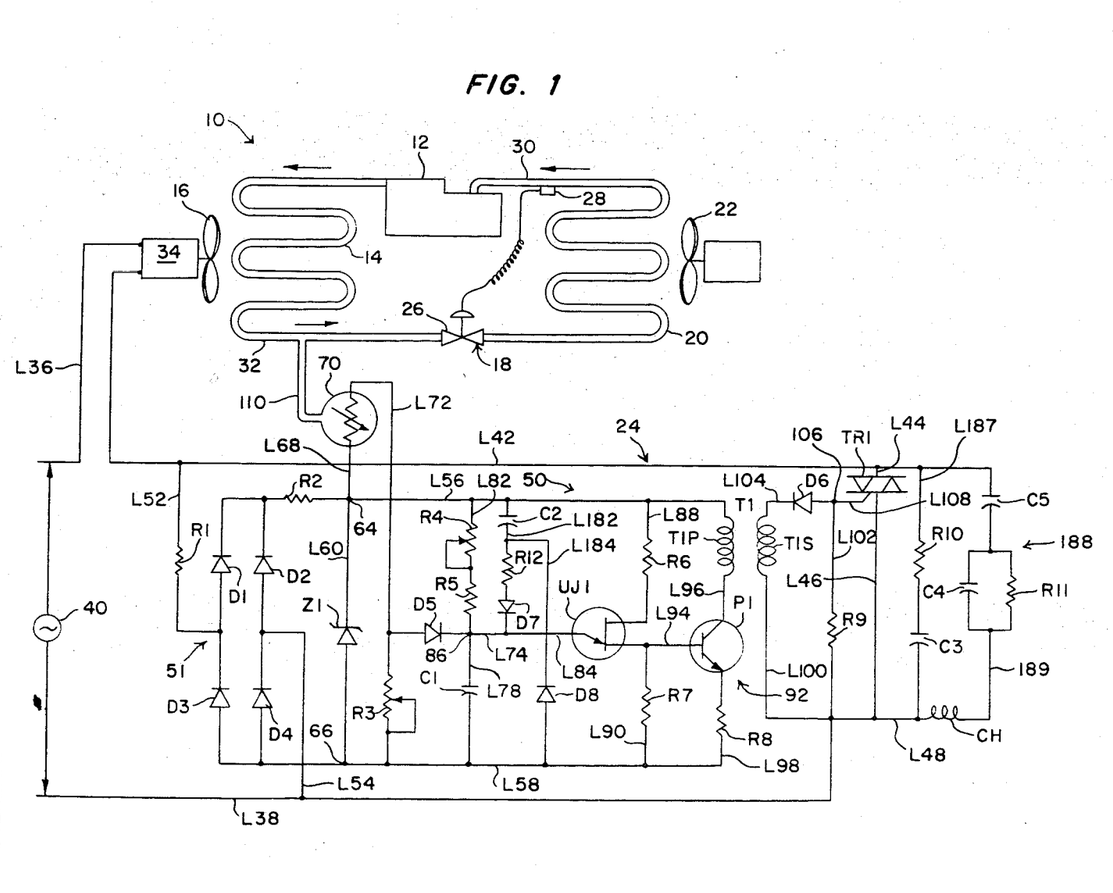
FIG. 1 is a schematic illustration of a refrigeration type air conditioning system provided with a control system constructed in accord with the principles of the present invention.

Referring now to the drawing, FIG. 1 depicts a refrigeration type air conditioning system 10, which includes a compressor 12, a condenser 14 with a fan 16, a metering device 18, and an evaporator 20 with a fan 22. Also included in system 10 is a control system 24 constructed in accord with the principles of the present invention which is capable of maintaining at least a minimum predetermined head pressure on the refrigerant on the high pressure side of metering device 18. It does this by decreasing the speed of condenser fan 16 and accordingly the flow of air over condenser 14 as the ambient temperature at the condenser decreases. By maintaining the specified minimum pressure on the high pressure side of the metering device the pressure across the metering device is kept at the minimum level necessary for efficient operation of the system irrespective of the decrease in the ambient temperature at the condenser.

With the exception of motor speed control system 24, the components of system 10 are of conventional construction.[2] Also, for the most part, system 10 operates in the conventional manner with compressor 12 raising the pressure of the refrigerant in the system and causing it to flow to condenser 14 where the refrigerant is condensed by air directed over the condenser by condenser fan 16 and gives up its heat load to the air. Due to the pressure exerted on it by the compressed gaseous refrigerant the condensed liquid refrigerant flows from the condenser to metering device 18. This device produces partial vaporization and cooling of the refrigerant, regulates the flow of refrigerant into the evaporator, and provides a barrier between the condenser, in which the pressure is relatively high, and the evaporator, in which the pressure is comparatively low.

From metering device 18 the refrigerant flows to evaporator 20 where it is further vaporized by the absorption of heat from air blown over the evaporator by evaporator fan 22, thereby lowering the temperature of

---

[1] If full speed operation of the fan were continued for a sufficiently long time at low temperature, the result would of course be an unacceptable decrease in the pressure differential across the metering device, resulting in inefficient operation of the refrigeration system and the other problems discussed above.

[2] As illustrated, metering device 18 includes a thermal expansion valve 26 connected to a temperature sensing element 28 located on the vapor line 30 connecting evaporator 20 to compressor 12. In actual practice the metering device might equally well be a capillary tube or other conventional control.

the air and/or that of the space in which the evaporator is located.[3]

Referring still to FIG. 1, decreases in the ambient temperature at condenser 14 can effect a decrease in the head pressure on the refrigerant in the liquid line 32 between the condenser and metering device 18 and, consequently, the pressure difference across the metering device with the adverse results described above. One way of preventing such a pressure reduction is to effect a corresponding decrease in the flow of air across the condenser to keep the pressure on the refrigerant generally uniform despite the decreased ambient temperature. As discussed above, this reduction in the flow of air across the condenser is automatically affected by control system 24, which reduces the speed of condenser fan motor 34 (and therefore the condenser fan) as the ambient temperature falls.

The illustrated motor speed control 24, which is of the ramp and pedestal type, includes main leads L36 and L38 connected to a suitable power source 40 (typically 115 or 220 volt A.C.). Lead L36 is also connected to the motor 34 of condenser fan 16. The motor, in turn, is connected by leads L42 and L44 to one terminal of a gate-controlled, solid state electronic switch TR1 which is preferably, although not necessarily, a Triac.

A Triac is a bidirectional thyristor, which may be gate triggered from a blocking to a conducting state for either polarity of applied voltage. Triacs are described in detail in General Electric Advance Specification 175.10 2/64 and General Electric Publication No. 175.10 2/65, to which reference may be had if deemed necessary for a complete understanding of the present invention.

The other terminal of Triac TR1 is connected by leads L46 and L48 to main lead L38. Therefore, when Triac TR1 is triggered to a conducting state, condenser fan motor 35 is connected across the source of operating voltage 40 through the Triac to energize the motor.

Condenser fan speed control system 24 also includes ramp and pedestal type motor speed control circuitry 50 for regulating the triggering of Triac TR1 to the conducting state and, accordingly, the speed of condenser fan motor 34. Speed control circuitry 50 includes a full wave rectifier 51 consisting of diodes D1, D2, D3, and D4 connected by leads L52 and L54 to leads L42 and L38. The output terminals of rectifier 51 are connected to the main leads L56 and L58 of circuitry 50.

Connected across leads L56 and L58 in lead L60 is a Zener diode Z1 which clips the full sine wave output from rectifier 51 since it becomes conducting in a reverse direction when the voltage across it increases to a predetermined level. Therefore the voltage across the terminals 64 and 66 between which the diode is connected will not exceed the voltage at which the diode becomes conductive and the potential across these terminals will remain constant as long as the sine wave output voltage from rectifier 51 equals or exceeds this voltage. The reference voltage established by the Zener diode also obviously appears across terminals 64 and 66.

Terminal 60 is connected through lead L68, pressure transducer 70, leads L72 and L74, a diode D5 in lead L74, and lead L78 to one side of a charging capacitor C1 in lead L78. The opposite side of the charging capacitor is connected by lead L78 to main lead L58 which, in turn, is connected to terminal 66 to provide a charging circuit for the capacitor.

At the beginning of each pulse from rectifier 51, capacitor C1 is rapidly charged through the circuit just described to a voltage equal to that at which the output wave is clipped less the voltage drop across pressure transducer 70, which is the pedestal voltage (capacitor C1 will typically charge to the pedestal voltage in $5 \times 10^{-4}$ sec.). As soon as capacitor C1 is charged to this point, the voltage across diode D5 drops to zero, and the diode becomes nonconducting.

Thereafter the capacitor continues to charge through a circuit including rectifier 51, leads L56 and L82, resistors R4 and R5, and leads L78 and L58. Thus, the ramp part of the charging step, occurs more slowly than the charging to the pedestal voltage. This is because the impedance through resistors R4 and R5 is purposely made considerably greater than that of the pressure transducer 70 so that the charging time constant will typically be approximately 200 times greater with diode D5 nonconducting than with it conducting.

Capacitor C1 continues to charge along the ramp through the circuit just described until the voltage to which it is charged reaches that at which unijunction transistor UJ1 will fire. The emitter of transistor UJ1 is connected by a lead L84 to terminal 86 so that the voltage applied to the emitter of the transistor is equal to the voltage to which the charging capacitor is charged. The remaining terminals of transistor UJ1 are connected through leads L88 and L90, in which resistors R6 and R7 are interposed, to main leads L56 and L58.

The firing of unijunction transistor UJ1 discharges capacitor C1 through a circuit including leads L78 and L84, the transistor, and lead L90, creating a firing signal which is amplified by a single stage amplifier 92 including transistor P1 and resistors R7 and R8.[4] The base of transistor P1 is connected to unijunction transistor UJ1 by lead L94, and the remaining terminals of transistor P1 are connected through leads L96 and L98, in which resistor R8 is interposed, to main leads L56 and L58.

The amplified firing signal is applied across the primary T1P of a pulse transformer T1. This induces a sufficiently high voltage in the transformer secondary T1S to fire Triac TR1. Because of the circuit including leads L100, L48, L102, and L104, the firing voltage also appears at terminal 106. Since terminal 106 is connected to the gate of the Triac through lead L108, the voltage at this terminal is similarly applied to the gate, triggering the Triac and making it conductive.

As shown in FIG. 1, a diode D6 is interposed in the lead L104 between terminal 106 and pulse transformer secondary T1S. This is because the output of the pulse transformer secondary decreases to zero and then tends to build up in the opposite direction after unijunction transistor UJ1 is made conductive. If this reverse polarity, induced voltage were applied to the gate of the Triac, it would shut off the Triac, prematurely returning it to its blocked or nonconducting state. Diode D6 blocks this reverse voltage, preventing it from shutting off the Triac.

Triac TR1 is triggered once during each pulse of output voltage from rectifier 51, thereby connecting condenser fan motor 34 across power source 40 to energize the motor during both the positive and negative halves of the power cycle. At the end of each half cycle, the polarity across power source 40 reverses and extinguishes the Triac by applying a reverse polarity voltage to its gate through leads L38, L102, and L108.

The pressure transducer 70 mentioned briefly above modifies the operation of the circuitry just described in such a manner that the speed of motor 34 is decreased as the head pressure on the refrigerant in the high side of system 10 decreases and vice versa. In other words, transducer 70 is the component which so correlates the speed of motor 34 to this head pressure as to maintain the pressure differential across metering device 18 con-

---

[3] For ease in explanation, system 10 has been illustrated and described as an air conditioning system. It will be obvious that evaporator 20 could equally well be used to cool brine as in a cold storage plant or to make ice or for the other purposes for which the cooling components of refrigeration systems are employed in their many applications and that a fan such as that identified by reference character 22 would not be employed in certain of these applications. The foregoing description of one exemplary application of refrigeration systems is accordingly not to be taken as limiting the scope of the present invention.

[4] The amplification stage described briefly above is conventional, and its details form no part of the present invention. For these reasons, a further description of it is not considered necessary.

stant and the operation of the system efficient, even at abnormally low temperatures.

The transducer, which is illustrated schematically in FIG. 1, may be any desired type of device having a pressure variable resistance. Transducer 70 is connected by conduit 110 to the liquid line 32 between condensor 14 and metering device 18. Accordingly, the pressure at the transducer is identical to that in the liquid line.[5]

As the ambient temperature at condenser 14 falls, the pressure on the refrigerant in the high side of system 10 decreases, causing a corresponding increase in the resistance across the transducer. This decreases the height of the pedestal of the capacitor charging wave form. Accordingly, an increased proportion of the charge on capacitor C1 is supplied during the ramp part of the charging cycle and a decreased part while the capacitor is being charged to the pedestal voltage. Since the capacitor is charged much more slowly along the ramp part of the cycle, the capacitor charging time is therefore increased under low ambient temperature conditions.

Since capacitor C1 charges more slowly under the conditions just mentioned, unijunction transistor UJ1 is fired at a later point and Triac TR1 accordingly triggered at a later point in each pulse of voltage from power source 40. Accordingly, the Triac is conductive and condenser fan motor 34 therefore energized for a smaller portion of each half cycle, reducing the speed of motor 34.

At the motor speed decreases, a smaller volume of air is moved across condenser 14 by fan 16. Thus, the increased rate of heat transfer from the refrigerant passing through condenser 14 to the air blowing over it at lower temperatures is offset by the decreased volume of air flowing over the condenser. Therefore, the rate at which heat is extracted from the refrigerant does not substantially increase at low temperatures; and its temperature is not reduced. Consequently, the pressure on the refrigerant in the high pressure side of the system remains at or above the desired minimum level under such conditions, maintaining the desired minimum pressure differential across metering device 18 nad insuring efficient operation of this system.

As indicated previously, any desired type of pressure transducer may be employed for the purposes described above. One suitable type of pressure transducer, illustrated in FIG. 2 and identified by reference character 112, includes a hollow, cylindrical housing 114 in which a conventional Bourdon tube 116 is mounted with one end of the tube supported from housing side wall 118 as by a bracket 120 clamped against the wall by a nut 122. Supported from the opposite, free end of Bourdon tube 116 as by a bracket 124 is a movable contact or electrode 126, which is isolated from the bracket by insulator 128.

Figure 2:
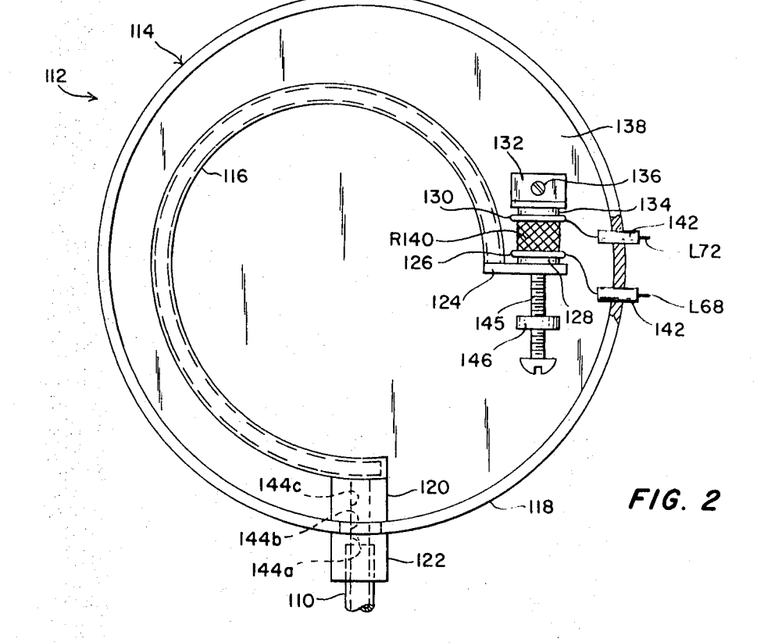
FIG. 2 is a side view of a pressure sensing transducer incorporated in the control system illustrated in FIG. 1.

Co-operating with electrode 126 is a second, stationary contact or electrode 130 mounted on a bracket 132 from which it is separated by insulator 134. Bracket 132 is fixed as by screw 136 to the rear wall 138 of transducer housing 114.

Fixed to and extending between movable electrode 126 and stationary electrode 130 is a variable resistance element R140. This may be made of Conductomer or a similar material having a resistivity that will decrease under compression and increase under tension.

The two electrodes 126 and 130 are connected to leads L68 and L72 (see FIG. 1), which extend into transducer housing 114 through insulators 142. The pressure tap or tube 110 extending from condenser liquid line 32 to the transducer terminates in nut 122 and communicates with the interior of Bourdon tube 116 through aligned passageways 144a–c in nut 122, the side wall 118 of the transducer housing, and Bourdon tube mounting bracket 120.

As the ambient temperature at condenser 14 and therefore the pressure on the refrigerant in liquid line 32 decreases, Bourdon tube 116 tends to contract; i.e., to assume a smaller diameter. This places movable electrode 126 away from stationary electrode 130, elongating element R140 and increasing its resistance. As explained above, this operates to reduce the speed of condenser fan motor 34 and thereby prevents an unacceptable reduction of the head pressure on the liquid in the condenser.

It may be desirable to limit the extent to which the speed of the condenser fan motor can be decreased so that it will not run below a predetermined speed regardless of the drop in ambient temperature. This can be accomplished by limiting the maximum resistance of the transducer incorporated in the control circuitry. In transtransducer 112, this is accomplished in extremely simple fashion by the use of a stop 145 fixed to the rear wall 138 of the transducer housing as by a bracket 146 and adapted to be engaged by the bracket 124 on which electrode 126 is mounted. Stop 145 therefore limits the movement of electrode 126; and, accordingly, the elongation of resistance element R140 and the extent to which the resistance of this element can increase. By threading stop 145 toward and away from bracket 124 in its supporting bracket 146, the maximum resistance of the transducer can be adjusted as desired for particular applications.

Figure 3:
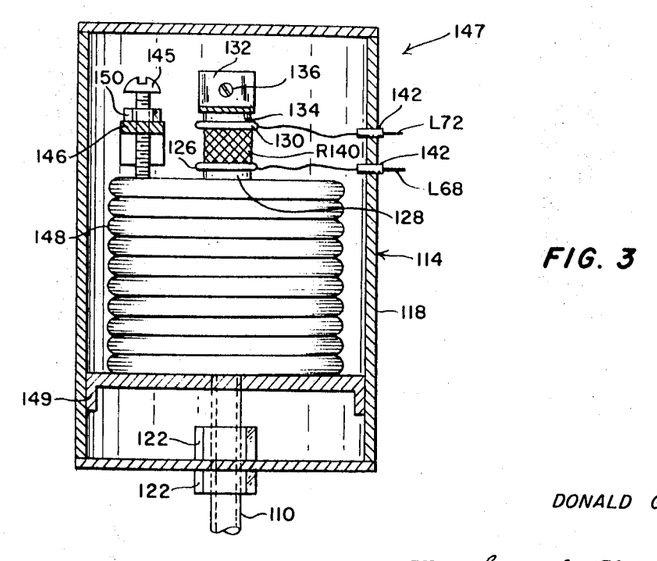
FIG. 3 is a side view, partly in section, of a modified form of pressure sensing transducer.

FIG. 3 illustrates a second type of pressure transducer 147 which may be employed in control systems constructed in accord with the principles of the present invention. This transducer differs from that shown in FIG. 2 in that the Bourdon tube of the latter is replaced with a bellows 148 attached at one end to a bracket 149 mounted on the side wall 118 of housing 114. The movable electrode 126 is fixed to the opposite end of the bellows from which it is separated by insulator 128. Pressure tap 110 in this embodiment extends through bracket 149 and communicates with the exterior of the bellows through its fixed end with nuts 122 clamping the tap in place.

The operation of transducer 147 is similar to that of transducer 112. As the pressure in bellows 148 changes, the bellows expands or contracts, causing a corresponding increase or decrease in the length of resistance element R140 as in the embodiment of FIG. 2. As discussed above, this effects a change in the speed of condenser fan motor 34 to prevent an unacceptable reduction in the head pressure on the liquid refrigerant in refrigeration system 10.

As in the embodiment just mentioned, an adjustable stop may be incorporated in transducer 147 to limit the elongation of resistance element R140 and, accordingly, the minimum speed of motor 34. This stop may take the form of a threaded member 145 fixed to the free end of bellows 148 and extending freely through bracket 146 so that it will slide back and forth in bracket 146 as the bellows expands and contracts. A nut 150 on member 145 can be adjusted therealong to limit the movement of the bellows in a direction away from bracket 146 and, consequently, the elongation of the resistance element.

Many modifications may of course be made in the transducers illustrated in FIGS. 2 and 3. For example, a pressure responsive diaphragm, or other element capable of movement upon a pressure change, can be substituted for the Bourdon tube and bellows in the illustrated transducers. As a further example of modifications which may be made, a spring can be connected to the bellows in transducer 147 to oppose or assist the bellows movement and to provide a way of calibrating the transducer.

Figure 4:
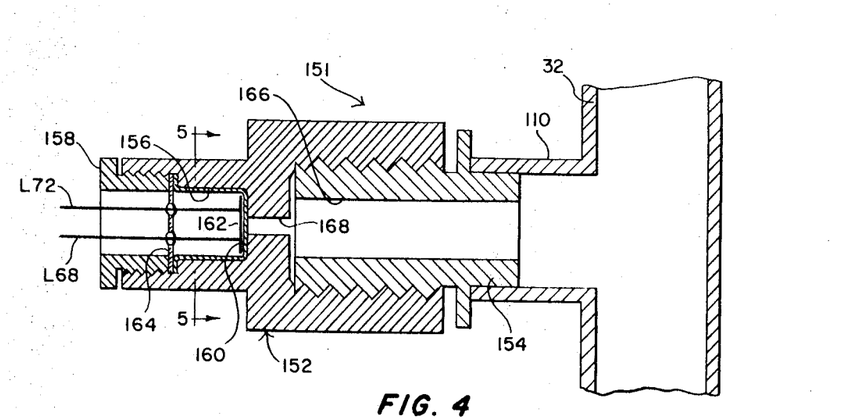
FIG. 4 is a section through a third form of pressure transducer.
Figure 5:
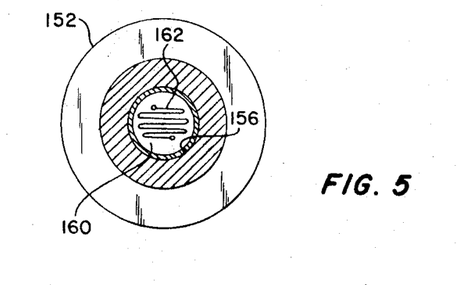
FIG. 5 is a section through the transducer of FIG. 4, taken substantially along lines 5—5 of the latter figure.

FIGS. 4 and 5 show yet another form of pressure transducer which may be employed in the practice of the present invention. This transducer, identified by reference character 151, includes a housing 152 attached to the tube 110 leading from liquid line 32 by a threaded fitting 154. Secured in a recess 156 in housing 152 by a threaded retainer 158 is a generally cylindrical, pressure responsive diaphragm 160.

---

[5] The tap to the high pressure side of system 10 is preferably made in the location just described for maximum accuracy in controlling the pressure differential across metering device 18. However, with only a slight decrease in accuracy, the tap may be located elsewhere on the high pressure side of the system where access, space requirements, or other considerations dictate against location of the tap on the liquid line.

Fixed at its opposite ends to diaphragm 160 is a conventional strain gage coil 162. In this case, the leads L68 and L72 extend through a support 164 secured in recess 156 by retainer 158 and are attached to the opposite ends of strain gage coil 162.

As shown in FIG. 4, communicating passages 166 in supports 154 and 168 in housing 152 provide fluid communication between liquid line 32 and diaphragm 160. Accordingly, as the pressure in the liquid line changes, there is a deflection of diaphragm 160 which results in a distortion of strain gage coil 162 and a corresponding change in its resistance. As in the case of the embodiments described above, the change in resistance results in a corresponding change in the speed of condenser fan motor 34.

Figure 6:
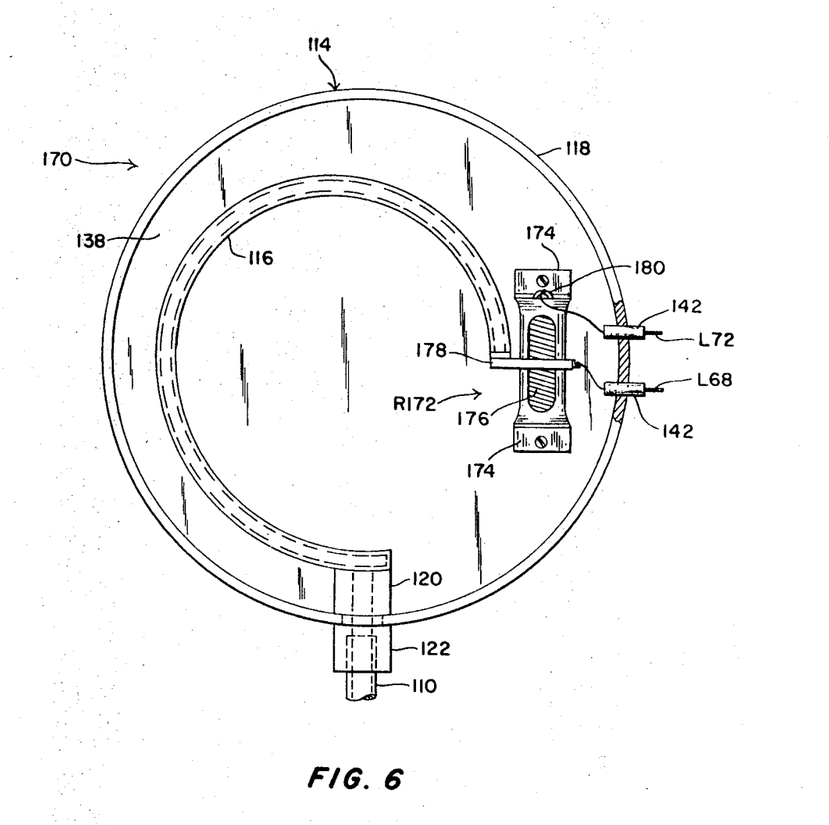
FIG. 6 is a side view of a fourth form of pressure transducer.

FIG. 6 illustrates yet another form of transducer, identified by reference character 170, which may be used in control systems of the type disclosed herein. Transducer 170 is similar to the transducer 112 described above except that the elastomeric resistor R140 of the latter is replaced with a conventional slide wire potentiometer R172 supported by brackets 174 from the rear wall 138 of housing 114.

The leads L68 and L72 are respectively connected to the resistance element 176 of the potentiometer and to its slide 178, which is attached to the free end of Bourdon tube 116. Accordingly, as the pressure in the Bourdon tube decreases and the tube contracts, slider 178 moves away from the terminal 180 to which lead L68 is connected, increasing the resistance across leads L68 and L72. With the transducer connected in a control system of the type contemplated by the present invention, the increased resistance will, as in the transducer embodiments described above, result in a reduction in the speed of the controlled motor.

The foregoing descriptions of transducers suitable for use in the control arrangements disclosed herein is not to be taken as meaning that other forms of pressure transducers cannot be used. On the contrary, virtually any pressure transducer capable of providing a relatively large resistance change in response to a relatively small change in pressure can be employed. Such transducers include, for example, those of conventional construction in which a piezoelectric crystal is the variable resistance element and those of the type disclosed in U.S. Pat. No. 3,325,761.

Returning now to FIG. 1, the basic speed control circuitry described previously is preferably provided with several additional components to increase its effectiveness and its versatility. Perhaps the most important of these is a timing device employed to provide full speed operation of system 10 when it is first started up, irrespective of the ambient temperature at condenser 14 (as explained previously, full-speed operation of the condenser fan upon start-up is desirable to prevent excessively high rates of pressure increase in the system). One suitable form of timing device, illustrated in FIG. 1, is a conventional timing circuit consisting of a capacitor C2, resistor R12, and diode D7 connected in series between leads L84 and L56 by lead L182. When power is initially applied to control system 24, capacitor C2 has no charge on it; and, accordingly, unijunction transistor UJ1 is triggered during the initial period of operation of system 10 through a circuit including rectifier 51, lead L56, capacitor C2, resistor R12, diode D7 and lead L84. Since this is a low impedance path, the pedestal voltage is sufficiently high to trigger unijunction transistor UJ1, and Triac TR1 is triggered at the earliest possible point in each half sine wave pulse from power source 40. This results in the maximum application of power to and full-speed operation of condenser fan motor 34.

As the system continues to operate, the charge on capacitor C2 increases; and, at the end of a predetermined period following start-up of the system, the capacitor is sufficiently charged to become nonconducting. At this point, operation of the system shifts to the mode described previously in which the condenser motor speed is regulated by the resistance across pressure transducer 70.

The delay circuitry just described also includes a diode D8 interposed in a lead L184 connected between capacitor C2 and resistor R12 at one end and connected to lead L58 at the other. Lead L184 completes a discharge path for capacitor C2 when the supply of power to control system 24 is interrupted, thereby draining the capacitor so that it will be in its uncharged state when the system 10 is again started up.

It is preferred that motor 34 be operated at substantially full speed for a period of about 40–60 seconds when system 10 is started up. Full-speed operation for periods of this magnitude can be obtained by employing a capacitor having a capacitance on the order of 100 mfd. and a resistor having on the order of 50K ohm resistance. Circuit elements of different values can of course be employed to produce full-speed operation for periods of different duration, if desired.

Referring again to FIG. 1, control circuitry 50 is also preferably (although it does not necessarily have to be) provided with components for adjusting the minimum and maximum speeds of the controlled motor 34. In the exemplary arrangement illustrated in FIG. 1 of the drawing, these components are potentiometers R3 and R4.

Control circuitry 50 is arranged to produce maximum speed operation of condenser fan motor 34 when the pressure on the refrigerant in system 10 is the highest. Under these circumstances, the resistance through transducer 70 is at its minimum and the pedestal voltage is accordingly at its maximum. This maximum voltage can be changed by adjusting potentiometer R3.

For example, as the resistance of the potentiometer is decreased, there is a corresponding decrease in the potential which can be reached at junctions 185 and 86 during the initial part of the charging cycle in which capacitor C1 is charged to the pedestal voltage. Decreasing the pedestal voltage increases the charging time since the charging rate along the ramp is much slower, and Triac TR1 is fired later in each cycle and remains conductive for a period of shorter duration. This results in a reduced motor speed under the maximum speed conditions described above.

Minimum speed is desired and produced by speed control circuitry 50 when the ambient temperatures at condenser 14 and the head pressure on the refrigerant in the high pressure side of system 10 are the lowest. Under these conditions, the resistance across transducer 70 is at a maximum. Accordingly, the pedestal of the charging wave form is very low; and vertually all of the charging is accomplished along the ramp of the charging wave form.

The slope of the ramp and, accordingly, the charging rate along the ramp may be altered by adjusting potentiometer R4 to vary the resistance in the ramp charging circuit because the ramp charging rate is purely a function of the resistance in the charging circuit. By adjusting the slope of the ramp and, accordingly, the charging rate therealong, the Triac is made conductive earlier and later in the half cycle for a given potential at terminal 186, and the minimum motor speed increased or decreased accordingly.

In addition to the components described previously, the circuitry illustrated in FIG. 1 is also preferably provided with various resistances identified by reference characters R1, R2, R6, and R9. These resistances are employed in the illustrated control system in accord with conventional practice to provide the impedance necessary at various points in the circuit to produce stable circuit operation.

The system 24 illustrated in FIG. 1 may also be provided with circuitry to limit the rate of voltage rise across Triac TR1 and thereby prevent it from being overloaded and with circuitry for suppressing radio frequency noise generated during operation of system 10. The voltage limiting device just mentioned is, in the embodiment of FIG. 1, a circuit which includes a capacitor C3 and resistance R10 connected in series between main power leads L48 and L42 by lead L187. When Triac TR1 is triggered, which causes an immediate surge of current through it, this circuit absorbs part of the surge, stabilizing the Triac and preventing it from being overloaded.

The circuit just described is also capable of providing some suppression of radio frequency noise. Additional suppression of R-F signals can be obtained by the optional filter circuit 188 shown in FIG. 1. In addition to a choke coil CH interposed in lead L48, filter circuit 188 includes a resistance R11 and capacitor C4 wired in parallel and connected at one end by lead L189 in which a second capacitor C5 is interposed to main power lead L42. The other end of the R-C circuit is connected by lead L189 to the other main power lead L48. This type of filter circuit, as such, is well-known; and the circuit operates in the conventional manner to suppress radio frequency noise generated during the operation of the control system. Accordingly, a detailed description of its function is not deemed necessary herein.

The ramp and pedestal type speed control just described is preferred for head pressure control applications because of its inherent accuracy. It is not essential, however, that this particular type of control be employed; and, in applications where the ultimate inaccuracy is not essential, other types of motor speed controlling circuits may be used. Typically of the suitable alternates is the phase type speed control illustrated diagrammatically in FIG. 7 and identified by reference character 190.

Figure 7:
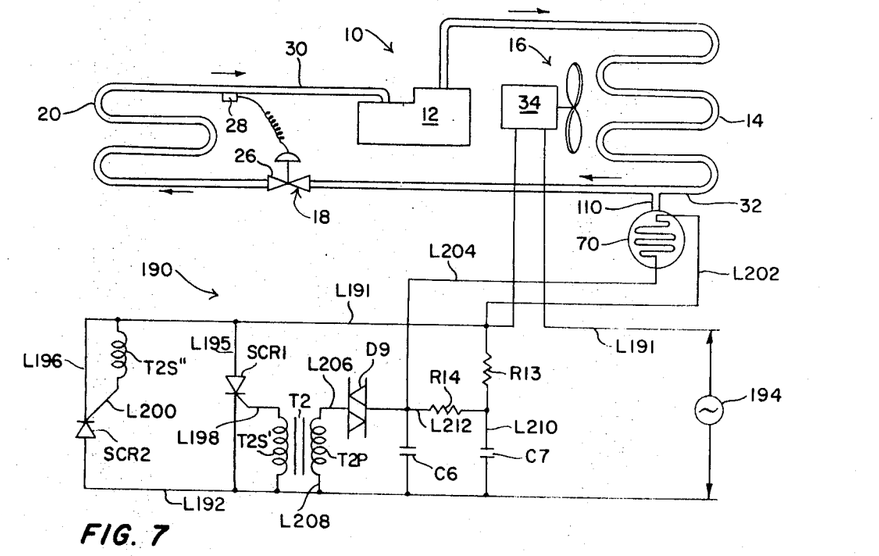
FIG. 7 is a schematic illustration of a refrigeration system similar to that illustrated in FIG. 1 but with a modified form of condenser fan speed control which is constructed in accord with the principles of the present invention.

To a considerable extent, the system components illustrated in FIG. 7 are identical to those described previously. Insofar as these components are the same, like reference characters will be employed to identify them.

Turning now to FIG. 7, control system 190 includes main leads L191 and L192 connected to a suitable A.C. power source 194. Lead L191 is also connected to condensor fan motor 34 which, in turn, is connected to lead L192 through silicon controlled rectifiers SCR1 and SCR2. The SCR's are connected in parallel across leads L191 and L192 by leads L195 and L196 and are arranged to conduct in opposite directions. Accordingly, when one of the SCR's is triggered to a conducting state, condenser fan motor 34 is connected across the source of operating voltage 194 through the conducting Triac to energize the motor. Like the Triac employed in control system 24, the SCR's remain conductive until the polarity of the power source reverses at which point the conducting SCR is returned to its nonconducting state.

The two SCR's are connected in the manner described above so that one will conduct when the voltage across power source 194 is of one polarity and the other when the voltage across the power source is of the opposite polarity. Accordingly, the motor will be connected across the power source during both halves of the power cycle.[6] The SCR's are triggered to a conducting state during the power cycle by charging a firing capacitor C6 in each half cycle and subsequently discharging it through the primary of a pulse transformer T2.

The secondary of pulse transformer T2 has two sections T2S' and T2S". The first of these is connected between the gate of SCR1 and main lead L192 by lead L198, and the second section T2S" of the secondary is connected between the gate of SCR2 and lead L191 by lead L200.

The discharge of capacitor C6 through pulse transformer T2P induces voltages of opposite polarity and of sufficient magnitude to fire the SCR's in the sections T2S' and T2S" of the transformer. Depending upon the polarity of the pulse through the primary this induced voltage will trigger one of the two SCR's to the conducting state.

Capacitor C6 is charged and discharged in opposite directions during alternate half cycles of the pulse from power source 194. Accordingly, the pulses induced in secondary sections T2S' and T2S" during successive half cycles are effective to alternately trigger the two SCR's. Because of the manner in which the gates of the SCR's are connected to the pulse transformer, each SCR will be made conductive in the half cycle in which it is capable of conducting in the direction in which the current from power source 194 is flowing during the half cycle.

As in the embodiment of FIG. 1, the speed of motor 34 is altered by varying the rate at which the firing capacitor is charged. As the charging rate is increased the firing pulse is produced earlier in the power cycle, the SCR's are fired earlier and remain conductive longer, and the motor speed increases. The opposite occurs as the charging rate decreases.

Referring again to FIG. 7, capacitor C6 is connected in series with pressure transducer 70 [7] across leads L191 and L192 by leads L202 and L204. The charging circuit for the capacitor includes power source 194, leads L191 and L202, pressure transducer 70, lead L204, the capacitor, and lead L192 with the current flowing in opposite directions through this circuit in successive half cycles.

Capacitor C6 is charged through the circuit described above until its voltage reaches the breakover voltage of a Diac D9 [8] connected between the capacitor C6 by leads L204 and L206. When the breakover voltage is reached, the Diac becomes conductive, and capacitor C6 is discharged through a path including leads L204 and L206, pulse transformer primary T2P, a lead L208 connecting primary T2P to lead L192, and the lead just mentioned. In successive half cycles of the pulse from power source 194 the capacitor discharges in opposite directions through this path, thereby producing transients in pulse transformer secondary sections T2S' and T2S" which will alternately trigger SCR1 and SCR2 in successive half cycles.

As in the embodiment of FIG. 1, transducer 70 regulates the speed of motor 34 by controlling the charging rate of the firing capacitor. As the ambient temperature at condenser 14 falls the pressure on the refrigerant in system 10 decreases; and the resistance across the transducer increases, producing a corresponding decrease in the charging rate. The SCR's are accordingly triggered at later points in the half cycles in which they become conductive and motor 34 is energized for a smaller portion of each half cycle, producing a speed reduction to maintain the desired minimum pressure differential across metering device 18 as explained in detail above.

In addition to the circuit components described above control system 190 includes a resistor R13 and capacitor C7 connected in series between leads L191 and L192 in lead L210 together with a second resistor R14. The latter is interposed in a lead L212 connected between resistor R13 and capacitor C7 at one end and to the junction between capacitors C6 and Diac D9 at the other.

The component just described constitute a two-stage R-C delay circuit. This circuit increases the range over which system 190 can control the speed of motor 34 and increases the stability and dependability of the control system during low-speed operation. Other components can also be employed for this purpose.

In addition to the components shown above control system 190 may also be provided with features of the control system described earlier such as the timing system which permits motor 34 to run at full speed for a speci-

---

[6] It will be apparent from the foregoing that the two SCR's can be replaced with a single Triac which is capable of conducting in both directions. This substitution simplifies the circuit since one solid state component (and probably pulse transformer T2) could be eliminated and because a Triac also possesses a certain inherent transient protection. Two SCR's are shown, however, to illustrate the variety of changes which may be made in the actual circuitry in which the principles of the present invention are embodied without exceeding the scope of the invention.

[7] Generally the same types of transducers may be used in this embodiment of the invention as in the embodiment described earlier.

[8] A Diac is a commercially available bidirectional diode which is normally nonconductive but is made conductive by the application of a specified voltage across its terminals. Diacs conduct in both directions. Diacs are described in greater detail in General Electric Advance Specification No. 175.30 to which reference may be made, if desired.

fied period when operation of system 10 is first initiated. Other features which may be incorporated in this embodiment of the invention include, without limitation, circuitry fod adjusting minimum and maximum motor speed, for limiting power surges through the SCRs, and for suppressing R-F noise. To avoid unnecessary repetition, however, these have not been shown in FIG. 7 or described above.

From the foregoing it will be apparent that other forms of wave chopping circuitry in addition to those exemplary types described above can be interposed between the pressure transducer and switching arrangement in control systems constructed in accord with the principles of the present invention. Accordingly, to the extent that such forms of the invention are not expressly excluded from the appended claims they are fully intended to be covered therein along with those many other modifications of the exemplary embodiments described above which will be obvious to those skilled in the arts to which the invention pertains.

The invention may be embodied in other specific forms wthout departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claims are therefore intended to be embraced therein.

What is claimed and desired to be secured by Letters Patent is:

1. In a refrigeration system, a condenser, means for circulating a refrigerant through said condenser, a fan for circulating air across said condenser to reduce the temperature of and thereby condense the refrigerant circulating therethrough, and control means including an element capable of directly sensing the head pressure in said refrigeration system for varying the speed of said fan as the head pressure changes to prevent the pressure from falling below a predetermined minimum during operation of said system and means for effectively preventing the operation of said fan speed varying means and permitting said fan to run at full speed when operation of the refrigeration system is first effected to thereby keep rapid initial pressure rises in said system from causng excessively high pressures therein by providing maximum fan speed and maximum condensation of the refrigerant circulating through said condenser.

2. The combination of claim 1, together with an electric motor for driving said fan and wherein said control means includes switch means connected in series with the fan motor and a source of operating voltage, whereby said motor is connected across said source of operating voltage and thereby energized when said switch means is closed, and cyclically operating circuit means for opening and closing said switch means, said circuit means including means for varying the duration of the period for which said switch means is closed in each operating cycle of said circuit means as the sensed pressure varies, whereby the motor speed is varied as the sensed pressure changes, said delay means being incorporated in said circuit means and operatively connected to said switch means around said duration varying means to permit the closing of the switch means for the period of maximum duration in each operating cycle of said circuit means and thereby the obtention of maximum motor speed upon the initial energization of the refrigeration system.

3. The combination of claim 1, wherein said delay means includes means effective at the end of a specified interval after start-up of the refrigeration system to shift the control of motor speed to said fan speed varying means.

4. In a refrigeration system, a condenser, means for circulating a refrigerant through said condenser, a fan for circulating air across said condenser to reduce the temperature of and thereby condense the refrigerant circulating therethrough, an electric motor for driving said fan, and control means including an element capable of directly sensing the head pressure in said refrigeration system for varying the speed of said fan as the head pressure changes to prevent the pressure from falling below a predetermined minimum during operation of said system, switch means connected in series with the fan motor and a source of operating voltage, whereby said motor is connected across said source of operating voltage and thereby energized when said switch means is closed, and cyclically operating switch controlling circuit means for opening and closing said switch means and for varying the duration of the period for which said switch means is closed in each operating cycle of said circuit means as the pressure sensed by said sensing element varies, whereby the speed of the fan motor is varied as the sensed pressure changes, said switch means comprising first and second parallel-connected switches and said circuit means comprising means for closing one of the switches during positive pulses of power from the source and the other switch during negative pulses of power from the source, whereby said motor is connected across the voltage source by one of said switches during positive pulses and by the other of said switches during negative pulses.

5. In a refrigeration system, a condenser, means for circulating a refrigerant through said condenser, a fan for circulating air across said condenser to reduce the temperature of and thereby condense the refrigerant circulating therethrough, an electric motor for driving said fan, and control means including an element capable of directly sensing the head pressure in said refrigeration system for varying the speed of said fan as the head pressure changes to prevent the pressure from fallng below a predetermined minimum during operation of said system, which means connected in series with the fan motor and a source of operating voltage, whereby said motor is connected across said source of operating voltage and thereby energized when said switch means is closed, and cyclically operating switch controlling circuit means for opening and closing said switch means and for varying the duration of the period for which said switch means is closed in each operating cycle of said circuit means as the pressure sensed by said sensing element varies, whereby the speed of the fan motor is varied as the sensed pressure changes, there being means incorporated in said circuit means for adjusting the duration of the period for which said switch means is closed in each operating cycle of the circuit means for pressures of predetermined magnitude, whereby the speed of said motor and the fan driven thereby at given sensed pressures can be varied as desired.

6. In a refrigeration system, a condenser, means for circulating a refrigerant through said condenser, a fan for circulating air across said condenser to reduce the temperature of and thereby condense the refrigerant circulating therethrough, an electric motor for driving said fan, and control means including an element capable of directly sensing the head pressure in said refrigeration system for varying the speed of said fan as the head pressure changes to prevent the pressure from falling below a predetermined minimum during operation of said system, switch means connected in series with the fan motor and a source of operating voltage, whereby said motor is connected across said source of operating voltage and thereby energized when said switch means is closed, and cyclically operating switch controlling circuit means for opening and closing said switch means and for varying the duration of the period for which said switch means is closed in each operating cycle of said circuit means as the pressure sensed by said sensing element varies, whereby the speed of the fan motor is varied as the sensed pressure changes, there being means incorporated in said circuit means for preventing said switch from being overloaded by a rapid increase of voltage thereacross when said switch is closed.

7. In a refrigeration system, a condenser, means for circulating a refrigerant through said condenser, a fan for circulating air across said condenser to reduce the temperature of and thereby condense the refrigerant circulating therethrough, an electric motor for driving said fan, and control means including an element capable of directly sensing the head pressure in said refrigeration system for varying the speed of said fan as the head pressure changes to prevent the pressure from falling below a predetermined minimum during operation of said system, switch means connected in series with the fan motor and a source of operating voltage, whereby said motor is connected across said source of operating voltage and thereby energized when said switch means is closed, and cyclically operating switch controlling circuit means for opening and closing said switch means and for varying the duration of the period for which said switch means is closed in each operating cycle of said circuit means as the pressure sensed by said sensing element varies, whereby the speed of the fan motor is varied as the sensed pressure changes, there being means incorporated in said circuit means for suppressing radio frequency noise generated during the operation of said motor.

8. In a refrigeration system, a condenser, means for circulating a refrigerant through said condenser, a fan for circulating air across said condenser to reduce the temperature of and thereby condense the refrigerant circulating therethrough, an electric motor for driving said fan, and control means including an element capable of directly sensing the head pressure in said refrigeration system for varying the speed of said fan as the head pressure changes to prevent the pressure from falling below a predetermined minimum during operation of said system, switch means connected between the fan motor and a source of operating voltage, whereby said motor is connected across said source of operating voltage and thereby energized when said switch means is closed, a source of control voltage, and cyclically operating circuit means connected between said source of control voltage and said switch means for opening and closing said switch means, said circuit means including means for varying the duration of the period for which said switch means is closed in each operating cycle of said circuit means as the control voltage applied to said circuit means is varied, said pressure responsive element including a variable resistor which is a conductive elastomeric member having a resistance which varies as its length changes connected between said control voltage source and said circuit means and means for varying the resistance of said resistor and therefore the control voltage applied to said circuit means as the sensed pressure changes, thereby varying the duration of the period for which the switch means is closed in each operating cycle of the circuit means and therefore the fan motor speed as the sensed pressure changes.

9. The combination of an electric motor and control means for so regulating the speed of the motor as to vary said speed in accord with changes in the pressure of a specified body of fluid, said control means including switch means adapted to connect the fan motor in series with a source of operating voltage, whereby said motor is connected across said source of operating voltage and thereby energized when said switch means is closed; cyclically operating switch controlling circuit means including a sensing element directly responsive to pressure for opening and closing said switch means and for varying the duration of the period for which said switch means is closed in each operating cycle of said circuit means as the pressure sensed by said sensing element varies, whereby the speed of the fan motor is varied as the sensed pressure changes; and means incorporated in said circuit means for selectively adjusting the duration of the period for which said switch means is closed in each operating cycle of the circuit means for a pressure of predetermined magnitude, whereby the speed of said motor at given sensed pressures can be varied as desired.

10. The combination of an electric motor and control means for so regulating the speed of the motor as to vary said speed in accord with changes in the pressure of a specified body of fluid, said control means including switch means adapted to connect the fan motor in series with a source of operating voltage, whereby said motor is connected across said source of operating voltage and thereby energized when said switch means is closed; cyclically operating switch controlling circuit means including a sensing element directly responsive to pressure for opening and closing said switch means and for varying the duration of the period for which said switch means is closed in each operating cycle of said circuit means as the pressure sensed by said sensing element varies, whereby the speed of the fan motor is varied as the sensed pressure changes; and means for effectively preventing the operation of said speed varying means and permitting said motor to run at full speed for a period of specified duration when operation of said motor is first initiated.

References Cited
UNITED STATES PATENTS

| | | | |
|---|---|---|---|
| 2,952,991 | 9/1960 | St. Pierre | 62—183 |
| 3,196,629 | 7/1965 | Wood | 62—183 |
| 3,354,665 | 11/1967 | Lewis | 62—184 |
| 2,939,317 | 6/1960 | Mason | 338—4 X |
| 3,160,844 | 12/1964 | McLellan | 338—4 |
| 3,270,562 | 9/1966 | Shrenreich | 338—4 |
| 3,329,023 | 7/1967 | Kurtz | 338—4 |
| 3,402,565 | 9/1968 | Maynard | 62—183 |
| 3,403,314 | 9/1968 | Maynard | 318—345 |
| 3,417,361 | 12/1968 | Huler | 338—4 |

WILLIAM J. WYE, Primary Examiner

U.S. Cl. X.R.

62—183, 507; 318—227, 335, 345; 338—4, 36